(12) United States Patent
Sharma (10) Patent No.: US 11,928,202 B2
(45) Date of Patent: *Mar. 12, 2024

(54) ULTRASAFE LOGIN

(71) Applicant: Gaurav Sharma, New Delhi (IN)

(72) Inventor: Gaurav Sharma, New Delhi (IN)

(73) Assignee: CertiSafe Private Limited, Delhi (IN)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,490

(22) Filed: Mar. 31, 2022

(65) Prior Publication Data

US 2022/0222331 A1    Jul. 14, 2022

Related U.S. Application Data

(63) Continuation of application No. 16/612,736, filed as application No. PCT/IB2018/053286 on May 11, 2018, now Pat. No. 11,514,152.

(30) Foreign Application Priority Data

May 11, 2017   (IN) .............................. 201711016640

(51) Int. Cl.
  *G06F 21/36*   (2013.01)
  *G06F 21/45*   (2013.01)
  *H04L 9/32*    (2006.01)
  *H04L 9/40*    (2022.01)

(52) U.S. Cl.
  CPC .............. *G06F 21/45* (2013.01); *G06F 21/36* (2013.01); *H04L 9/3226* (2013.01); *H04L 63/083* (2013.01)

(58) Field of Classification Search
  None
  See application file for complete search history.

(56) References Cited

U.S. PATENT DOCUMENTS

| 7,908,645 | B2 | 3/2011 | Varghese et al. |
| 2006/0097987 | A1* | 5/2006 | Hughes ............... G06F 3/03543 345/156 |
| 2008/0172382 | A1* | 7/2008 | Prettejohn ............. H04L 63/126 |

(Continued)

OTHER PUBLICATIONS

International Search Report for priority application PCT/IB2018/053286, dated Aug. 21, 2018.

(Continued)

*Primary Examiner* — Nelson S. Giddins
(74) *Attorney, Agent, or Firm* — Heslin Rothenberg Farley & Mesiti PC (57) ABSTRACT

Our Names in physical and real world have transformed into 'username's in virtual digital world. Anything that we need to access in digital world asks us for a 'username', which can be user selected (like an e-mail address) or provided to a user (like an employee ID/Number). This 'username' has indeed become a SuperName, giving access to restricted areas, based on privileges, links to other services as well. So, to a cybercriminal, if a 'username; is known, more than half the job is done. And once corresponding password is cracked, the whole digital identity lies threadbare. Damages done through transactions of such unauthorized access may get quantified, but dent to privacy is far more damaging.

7 Claims, 5 Drawing Sheets

(56) References Cited

U.S. PATENT DOCUMENTS

| | | | | |
|---|---|---|---|---|
| 2013/0263240 A1* | 10/2013 | Moskovitch | .......... | H04L 63/083 |
| | | | | 726/7 |
| 2014/0053098 A1* | 2/2014 | Leyon | ..................... | G06F 21/31 |
| | | | | 715/780 |
| 2014/0173450 A1* | 6/2014 | Akula | ................. | G06F 21/6245 |
| | | | | 715/741 |
| 2015/0207791 A1* | 7/2015 | Johnson | ................ | H04L 63/083 |
| | | | | 713/185 |

OTHER PUBLICATIONS

ISA Written Opinion for priority application PCT/IB2018/053286, dated Aug. 21, 2018.
https://docs.microsoft.com/en-us/windows/security/threat-protection/security-policy-settings/interactive-logon-dont-display-username-at-sign-in (Apr. 19, 2017).

* cited by examiner

PRIOR ART

ULTRASAFE LOGIN

CROSS-REFERENCE TO RELATED APPLICATION

This application is a continuation to U.S. patent application Ser. No. 16/612,736 filed Nov. 11, 2019, entitled "ULTRASAFE LOGIN" which is incorporated by reference herein in its entirety, which claims priority to Patent Cooperation Treaty Application Number PCT/IB2018/053286, filed May 11, 2018, which is incorporated by reference herein in its entirety, which claims priority to Indian Application No. 201711016640 filed May 11, 2017, entitled "ULTRASAFE LOGIN" which is incorporated by reference herein in its entirety.

BACKGROUND

UltraSafe endeavors to highlight this glaring gap and has devised innovative functional and technical methods to plug this gap. Sole objective of UltraSafe is to begin security from the very first step, i.e. the login screen by modifying the 'username' in innovative ways that become impossible for a bystander to see and understand or to significantly increase the difficulty level for guessing it correct.

UltraSafe stealth attribute is need based and can be accessed or removed depending on user preference, especially in public places. Let's view it as a large gathering of people for any purpose, may be working together a well, but not shouting or publicizing names (their names), but only when needed.

FIELD OF INVENTION

UltraSafe is an inventive step in field of Cyber Security wherein the 'username' is accorded stealth or similar protection while being entered in the 'username' field of a login screen.

UltraSafe is an inventive step in field of Cyber Security wherein even the 'password' is accorded stealth or protection similar to the Username field as described in detail, without any compromise on functionality or deterioration of desired services or results.

It is well known that basic and primary method of restricting access to a system is through a set of 'username' and password, wherein a password may be common for multiple users, but the 'username' is designed to be unique. Uniqueness of 'username' is diligently checked prior to even allocation, clearly highlighting importance of its purpose UltraSafe transforms the entry of 'username' field in innovative ways to make it impossible for any bystander to read or decipher. Drawing from the perfect analogy of 'Lock and Key', the inventive step in UltraSafe is to hide the lock itself in a way that an attacker sees place for a lock but never be able to identify any of its aspects.

UltraSafe and all of its variants do not compromise on user convenience and user is able to switch off the stealth/scramble feature or see the real values being entered.

BACKGROUND OF INVENTION WITH REGARD TO DRAWBACKS ASSOCIATED WITH KNOWN ART

A set of lock and key symbolizes basic, visible security. In digital world, a 'set' of 'username' (u/n) and password (pwd) deliver similar result. Akin to a key, passwords are designed to be kept secret and akin to a lock, 'username' continues to lie in the open—currently.

In real and physical world, thieves and burglars target the lock first—not the Key. They will work to break the lock altogether or generate a key that opens the lock. Even in virtual and digital world, a cyber thief would target a known 'username' and then work to generate its corresponding key to enter the 'username'-'password' restricted area.

On one hand, the lock or 'username' gives a feeling of secure access, on the other hand it raises curiosity, intrigue and fascination on what is being protected, prompting a possible attempt to break-in.

This holds true even for those who, with no intention or purpose of a theft/intrusion, wish to declare an achievement, show an expertise or expose a vulnerability.

Even with security paraphernalia like fencing or manually guarding a premise, thieves strike. Similarly, even with additional security paraphernalia like firewalls, SSL, encryption, etc., cyberthieves strike and gain entry through compromised 'username's-password.'

To further add to misery, a convenience feature—Auto-Fill, allows previously filled data to be not just retained, but is clearly visible at the clock of mouse button or as and when you start entering anything in requisite place.

Even by using the popular virtual keyboard that shuffles alphabets randomly, there isn't an increase in security levels. One may be able to secure (to some extent), keypresses from data intercepting spyware, but is of no use against prying eyes. Shoulder surfing/surveillance is often the first step of cybercriminals against a potential victim. Target is not the person per se, but the 'username'.

Ironically, in digital world, even cutting—edge technologies for security measures like firewalls, SSLs, DSCs, Tokens etc. have a human being as a user/administrator. And, to configure any of these measures, it all starts with a 'username'.

So, the "Lock" is out in the open and for anyone to pick on—physical lock or 'username'. Such digital footprints are fully ignored fearing user restrictions of inconvenience.

By ensuring that 'username' gets accorded seriousness and secretiveness of levels similar to passwords, a significant number of attacks or potential attacks can thus be reduced.

Yet, no amount of security (physical or digital) is ever enough. It is a continuous marathon tussle between defenders and attackers. Prudence demands to continuously provide/upgrade cybersecurity measures and always be a leap ahead of attackers—before they catch up again. The loser obviously loses a lot more than just valuables.

OBJECT OF INVENTION

The object of UltraSafe Login invention is the humble 'username' which is always visible to anyone and everyone and becomes a starting point for hacking, but security around the same is completely ignored. A simple account when hacked, opens possibilities of serious damage at a later stage. Hence, to increase security, accounts being used need to be secured further and UltraSafe aims to exactly achieve it through innovative methods without compromising on user convenience.

Forensics often point out that accounts get compromised due to passwords(s) becoming known (by any means), actually, it is a 'set' of 'username' and password and not just passwords. Security aspects are continuously focused on passwords, which are mere keys to the lock. Endeavor is thus to equally secure the 'username', rather than just password.

UltraSafe Login is also particularly useful for Remote Administration Consoles, wherein a user logs in to the console of a remote machine, accesses a restricted area/application secured by a 'username' and 'password', but is completely oblivious of any watchful eyes.

Object of UltraSafe Login invention is also to accord similar level of security (as being discussed in detail for the username field) for the 'password' field as well, bringing both at par and exponentially increasing the difficulty levels for hackers/crackers/attackers.

STATEMENT OF INVENTION

UltraSafe Login is transforming the onscreen 'username' in a way making it impossible for a bystander to read or understand, thereby significantly decreasing possibilities of account hacking, at the same time not compromising on user convenience.

UltraSafe Login is also the transformation of the password field by bringing both username and password fields at par in terms of security defined for either.

SUMMARY OF INVENTION

The inventive step allows users themselves, or service providers to choose one of the methods of letting their users, enter their 'username' in a manner that makes it meaningless to any bystander. At the same time, the said 'username' could be viewed in 'normal' mode as if the chosen security feature(s) weren't applied when the user hovers a mouse over the 'username' field or by clicking on the view button given alongside the UltraSafe 'username' field.

The said 'username' transformation may be based on one or more attributes like language, stealth, obscure, garble, rearrangement etc. and is easily reconverted into the mode understood by the user as shown in the examples in detailed description.

BRIEF DESCRIPTION OF THE DRAWINGS

A typical login screen is shown in FIG. 1.

DETAILED DESCRIPTION

It is well known that numerous IT applications (hereafter referred as 'Application' and referring to any technology-based interface, accessed on IT devices like computers, servers, mobile devices etc. or through a web browser for websites or as a local installation or a remote installation etc.) deploy numerous security safeguards to ensure authorized access.

The most common method is to allow access through a 'Login' Screen, wherein users enter a 'username' and a 'password'. It is assumed that password would be kept secured/secret/safeguarded by the holder/provider/manager etc., of said 'username'.

Such 'username' and 'password' are entered/typed/echoed on this 'Login' screen in text boxes or when prompted to enter a secured area/resume a locked out session/ad-hoc user validation check etc.

Both 'username' and password are required to get matched against corresponding entries as stored in database. Incorrectness in any or mismatch between the 'username' & 'password' as a singular set will result in a failed attempt login.

UltraSafe Login is a simple method wherein the 'username' field in a login screen reflects a modified onscreen output, based on the method chosen by the user and/or system configuration, post which it does not remain the readily readable 'username' entered by user.

UltraSafe Login also has an optional stealth mode, wherein the 'username' even if entered continues to be shown as blank/non-modifiable field/same color as the background to give an impression of no entries have been made.

In a few UltraSafe variants, the entries made by the user are displayed in a modified manner by using a cipher for each character entered by the user.

User can, if this option is so configured, optionally click on 'view' button, available next to UltraSafe 'username' field and view the entry made.

User can, if this option is so configured, optionally hover the mouse pointer over UltraSafe 'username' field and view the entry made.

If, user chooses to not click on the view button or do a mouse pointer hover over the UltraSafe 'username' field, but is confident that the 'username' entry made is correct, clicks on login or similar button to proceed, the UltraSafe based system so configured would treat the entry without prejudice and modification and return the result as 'invalid username' if it was entered incorrectly or allow access if it was indeed entered correctly. This is based on assumption and premise that the corresponding password so entered was also correct and was not the cause of error/denied access.

Though, enhancing security of the username is being professed in this invention, particularly comparing username field security to existing security available for the password field, UltraSafe Login's objective is to secure the overall login process and the same can be achieved best only if both username and password fields have optimal UltraSafe login security. However, this is not a limiting factor and parity in security level is optional.

Figure 1:
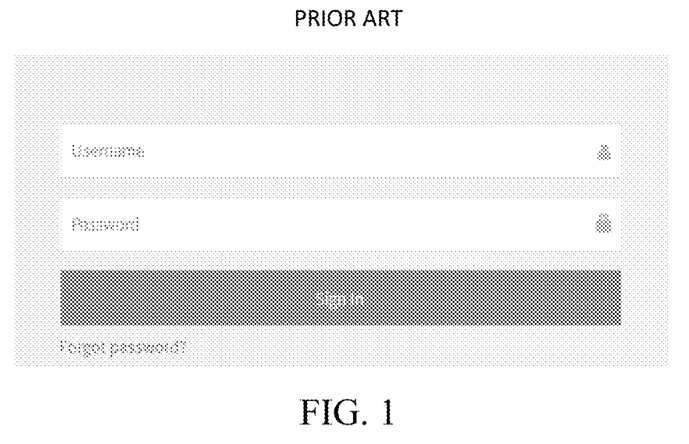

Giving below one of the forms (obfuscation) of the UltraSafe Login for clearer understanding:

A typical login screen is shown in FIG. 1.

FIG. 1: A General Login Screen

In a general login screen, password is usually obfuscated while 'username' is not.

Numerous methods are known to 'crack' passwords. With advancements in technology and a desire to unhide the hidden, numerous software are available to 'crack' passwords. Such actions allow unauthorized access once the said password is 'cracked'. Underlying problem with this method is that a password is mapped to the said 'username' and once password is 'username' is identified, 'cracker' or attacker enters the known set of 'username' and password in designated location and gains access.

All this happens since the 'username' is known.

By hiding/obfuscating the 'username' and well, UltraSafe makes the task of hackers/crackers almost impossible, since the hackers/crackers now do not even know what to lock to break.

To use an analogy of 'username' and 'password' as 'Lock and Key', 'UltraSafe Login' ensures that even the 'Lock' is also not known to anyone even if its 'Key' becomes known.

So, UltraSafe creates a conundrum for the hackers/crackers in terms of what to crack first and how . . . since the key cannot be created as the lock is not known and lock cannot be created even if key is known. So, effectively, the crackers do not know what to crack?

At the same time, 'UltraSafe Login' does not provide any inconvenience to the Users, since a bondafide or an authorized user would be aware of his/her 'username'. Thus, in a public place or place of work, Users can choose to hide their 'username' also from prying eyes.

In case, the User does feel the need to see the entered 'username', existing technologies of showing/viewing the obfuscated data is applied to the 'username' field also, ensuring the User to view/correct the entered 'username'.

Additionally, a convenient, simple to use 'UltraSafe Login' Toggle Switch is also provided that allows Users to switch off this voluntary feature. So, Users can switch off the "UltraSafe Login' at home or in private areas where no once can see what is being entered.

Figure 2:
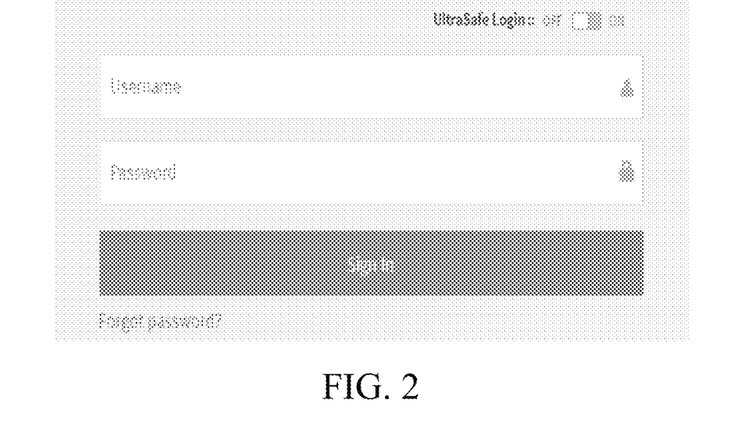
FIG. 2 depicts an UltraSafe Login Screen (Ultra.Safe is switched Off)

The following figures show the simple 'UltraSafe Login'.
FIG. 2 is an UltraSafe Login Screen (Ultra. Safe is switched Off)

Figure 3:
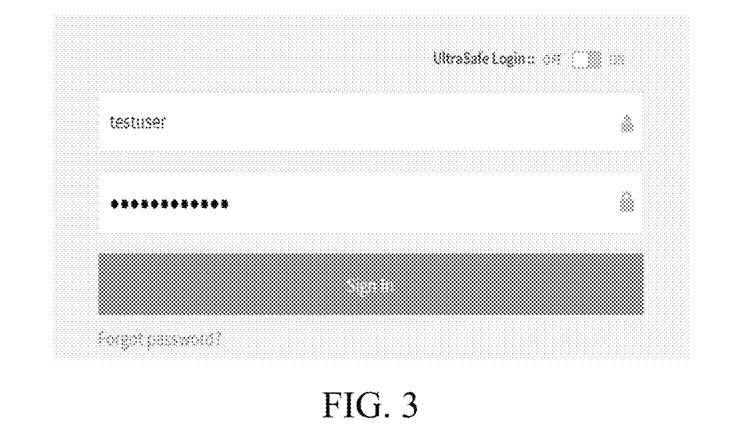
FIG. 3 depicts an UltraSafe Login Screen where 'username' when entered, can be easily, password is obfuscated (Utlra.Safe is switched Off).
Figure 4:
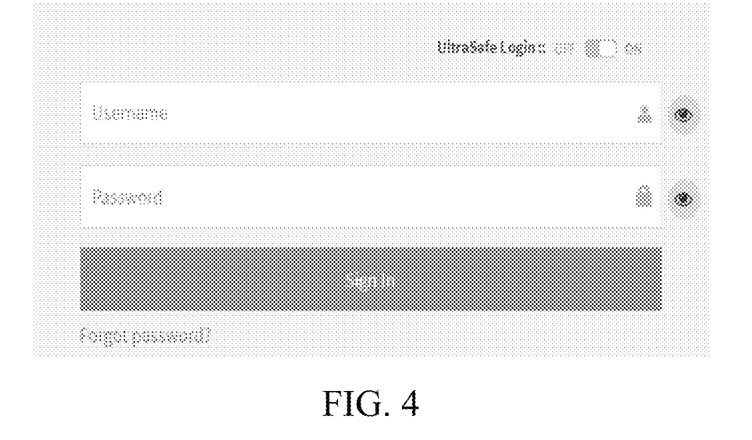
FIG. 4 depicts an UltraSafe Login Screen with view buttons appear for both. 'username and password' (UltraSafe is switched On).

FIG. 3 shows that 'username' when entered, can be seen easily, password is obfuscated Ultra. Safe is switched Off In FIG. 4 View buttons appear for both 'username and Password (Ultra. Safe is switched On)

Figure 5:
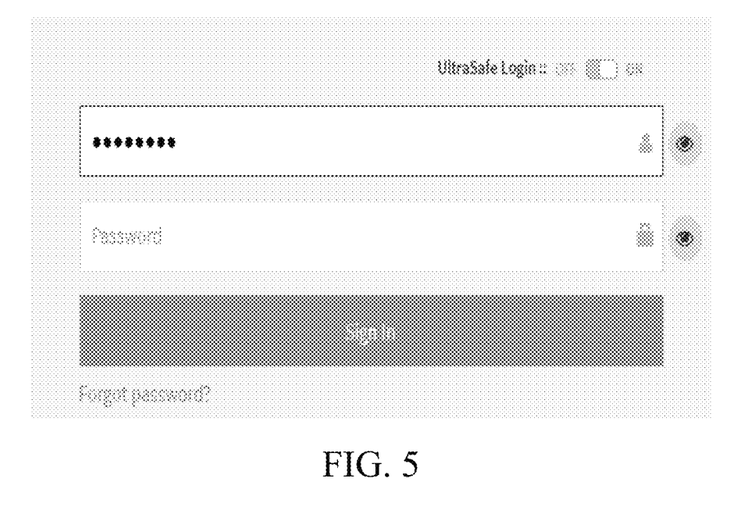
FIG. 5 depicts an UltraSafe Login Screen where 'username appears obfuscated, when entered (Ultra. Safe is switched On)

In FIG. 5 username appears obfuscated, when entered (Ultra.Safe is switched On).

Figure 6:
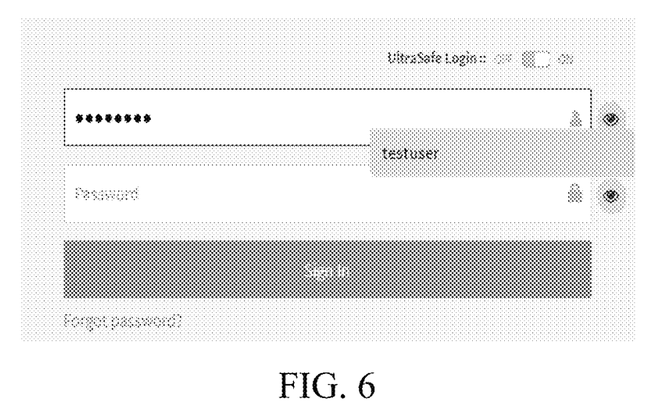
FIG. 6 depicts an UltraSafe Login screen where an obfuscated username can be seen only by clicking on the View Button (Ultra. Safe Login is switched On)

In FIG. 6 Obfuscated username can be seen only by clicking on the View Button (Ultra.Safe is switched On)

Figure 7:
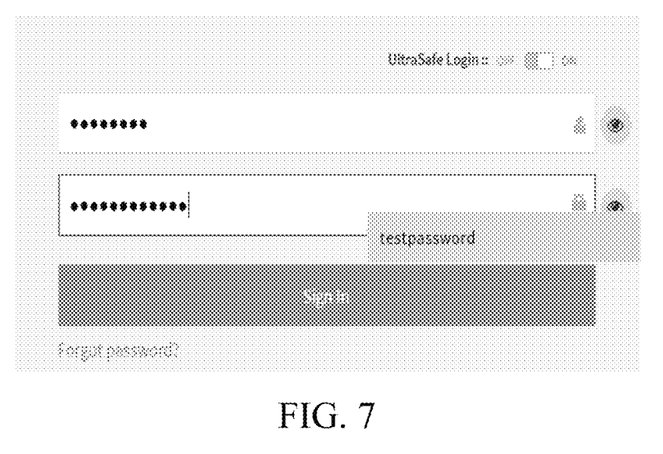
FIG. 7 depicts an UltraSafe Login Screen where obfuscated password can be seen only by clicking on the View Button (Ultra.Safe is switched On)

In FIG. 7 Obfuscated Password can be seen only by clicking on the View Button (Ultra.Safe is switched On)

Figure 8:
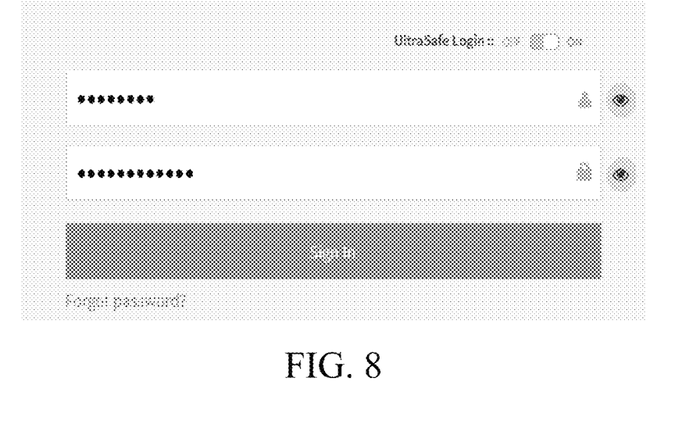
FIG. 8 depicts an UltraSafe Login Screen where obfuscated 'username'/password cannot be seen if not clicked on the view button (Ultra. Safe is switched On).

In FIG. 8 Obfuscated 'username'/Password cannot be seen if not clicked on the view button.

(Ultra.Safe is switched On)

As can be clearly seen, the UltraSafe Login, without compromising on user convenience or desired functionality, not only completely secures the username, but also completely defines the privacy aspects as desired by every user.

An additional example of UltraSafe Login is using a smart cipher for Username and Password that could also be set by the users themselves.

To explain this simply, let's assume that every user has the following set of credentials for logging into a system:

Username: Gaurav
Password: Sharma

The configured cipher for this system converts this set as follows

Username: Ultra
Password: Safe

So, now whenever the said user would enter the username as shown in [0061], the smart cipher will convert it into [0064] and similarly, when the password is entered as shown in [0054], the smart cipher displays the text as [0065]. It needs to be noted that simple English text has been used for explanation and UltraSafe Login is not limited to this alone and different ciphers could be deployed by users and system designers.

This would happen every time and each time, assuring the user that if such strings are displayed, the entries made are correct and the so configured system shall allow requested access.

However, to an attacker this would seem to be a walk in the park, but any such misdemeanor would never get executed.

In a further enhancement, the users should be allowed to choose their own ciphering mechanism once they have logged in to a system, with or without UltraSafe, in a way that they can easily memorize the ciphered details. In such a case, once the user enters the actual username and password and clicks out of the designated field area, if the username and passwords entered are correct, the ciphered string would be displayed. If the ciphered string is not displayed/is incorrect, the user can undertake required corrections. Thus, even before clicking on the login/proceed button, the users get to know if the details entered by them are correct or not.

The most interesting aspect for this example is that once an attacker attempts to log on to the restricted access area, the available security apparatus can easily track the same. Thus, not only undesired intrusion is prevented or trapped at that point of time, necessary flagging could be undertaken to mark such prospective threat for future.

I claim:

1. A computer-implemented comprising:
   receiving, by one or more processors, a username and a password as input from a user, in respective fields on a graphical user interface (GUI) comprising a login screen of an application;
   generating, by the one or more processors, a ciphered text corresponding to an input selected from the group consisting of: the received username and the received password;
   displaying, by the one or more processors, the ciphered text as a modified onscreen output on the login screen, alongside a respective entered username or entered password which is shown in an unreadable form on the login screen;
   providing, by the one or more processors, viewing controls accessible via the GUI, wherein the viewing controls comprise a given control, where based on utilizing the given control, the unreadable form of the username or the unreadable form of the password are made viewable on the login screen or are not viewable on the login screen; and
   verifying, by the one or more processors, the user is an authorized user of the application based on the ciphered text displayed as the modified output on the login screen, whether or not the unreadable form of the username or the unreadable of the password are viewable based on the user utilizing the given control.

2. The method of claim 1, wherein the viewing controls further comprises a stealth mode setting, wherein engaging the stealth mode displays the respective fields on the login screen as being empty upon entry of one or more of the username and the password.

3. The method of claim 1, where based on utilizing the given control, the username is displayed as the unreadable form of the username during the receiving.

4. The method of claim 1, where based on utilizing the given control, the password is displayed as the unreadable form of the password during the receiving.

5. The method of claim 1, where based on utilizing the given control, the username is displayed based on a user hovering over the respective username field.

6. The method of claim 1, where based on utilizing the given control, the username is displayed based on a user hovering over the respective username field.

7. A computer system comprising:
a memory; and
one or more processors in communication with the memory, wherein the computer system is configured to perform a method, said method comprising:
receiving, by one or more processors, a username and a password as input from a user, in respective fields on a graphical user interface (GUI) comprising a login screen of an application;
generating, by the one or more processors, a ciphered text corresponding to an input selected from the group consisting of: the received username and the received password;
displaying, by the one or more processors, the ciphered text as a modified onscreen output on the login screen, alongside a respective entered username or entered password which is shown in an unreadable form on the login screen;
providing, by the one or more processors, viewing controls to the user, accessible via the GUI, wherein the viewing controls comprise a given control, where based on utilizing the given control, the unreadable form of the username or the unreadable form of the password are made viewable on the login screen or are not viewable on the login screen; and
verifying, by the one or more processors, the user is an authorized user of the application based on the ciphered text displayed as the modified output on the login screen, whether or not the unreadable form of the username or the unreadable of the password are viewable based on the user utilizing the given control.

* * * * *